(12) United States Patent
Grant

(10) Patent No.: US 11,754,086 B2
(45) Date of Patent: Sep. 12, 2023

(54) BEARING HOUSING FOR A FLOW MACHINE AND A FLOW MACHINE WITH A BEARING HOUSING

(71) Applicant: Sulzer Management AG, Winterthur (CH)

(72) Inventor: Sean Grant, Leeds (GB)

(73) Assignee: SULZER MANAGEMENT AG, Winterthur (CH)

( * ) Notice: Subject to any disclaimer, the term of this patent is extended or adjusted under 35 U.S.C. 154(b) by 176 days.

(21) Appl. No.: 17/122,148

(22) Filed: Dec. 15, 2020

(65) Prior Publication Data

US 2021/0215165 A1 Jul. 15, 2021

(30) Foreign Application Priority Data

Jan. 14, 2020 (EP) ..................................... 20151826

(51) Int. Cl.
| | | |
|---|---|---|
| *F04D 29/06* | (2006.01) | |
| *F04D 29/053* | (2006.01) | |
| *F04D 29/056* | (2006.01) | |
| *F04D 29/42* | (2006.01) | |

(Continued)

(52) U.S. Cl.
CPC ......... *F04D 29/061* (2013.01); *F04D 29/053* (2013.01); *F04D 29/056* (2013.01); *F04D 29/4206* (2013.01); *F04D 29/582* (2013.01); *F04D 29/063* (2013.01)

(58) Field of Classification Search
None
See application file for complete search history.

(56) References Cited

U.S. PATENT DOCUMENTS

| | | | |
|---|---|---|---|
| 2,352,206 A | 6/1944 | Kendall | |
| 2014/0272496 A1* | 9/2014 | Han ................... | H01M 10/613 429/83 |
| 2015/0322756 A1 | 11/2015 | Cunningham et al. | |

FOREIGN PATENT DOCUMENTS

| | | |
|---|---|---|
| CN | 205071563 U | 3/2016 |
| DE | 961548 C | 4/1957 |
| DE | 961584 * | 4/1957 |

(Continued)

OTHER PUBLICATIONS

Extended European Search Report dated Jun. 26, 2020 in corresponding European Patent Application No. 20151826.3, filed Jan. 14, 2020.

*Primary Examiner* — Juan G Flores
(74) *Attorney, Agent, or Firm* — GLOBAL IP COUNSELORS, LLP

(57) ABSTRACT

A bearing housing for a flow machine includes a bearing chamber configured to receive a bearing, and a lubricant chamber arranged at the bearing chamber and configured to receive a lubricant. The bearing chamber is in fluid communication with the lubricant chamber via an opening such that the lubricant is capable of flowing between the bearing chamber and the lubricant chamber. The bearing housing includes a wall portion with a cooling fin to dissipate heat of the lubricant to an environment. The cooling fin includes a conduit for the lubricant through which conduit the lubricant chamber and the bearing chamber are in fluid communication such that the lubricant is capable of being conducted from the lubricant chamber into the bearing chamber through the conduit to dissipate the heat to the environment.

17 Claims, 3 Drawing Sheets

(51) Int. Cl.
*F04D 29/58* (2006.01)
*F04D 29/063* (2006.01)

(56) References Cited

FOREIGN PATENT DOCUMENTS

| | | |
|---|---|---|
| DE | 961584 C | 4/1957 |
| EP | 0 235 505 A2 | 9/1987 |
| EP | 3 730 796 A1 | 10/2020 |
| FR | 2 546 605 A1 | 11/1984 |
| FR | 2546605 * | 11/1984 |
| JP | S57145348 A | 9/1982 |
| WO | 2019/002358 A1 | 1/2019 |

* cited by examiner

BEARING HOUSING FOR A FLOW MACHINE AND A FLOW MACHINE WITH A BEARING HOUSING

CROSS-REFERENCE TO RELATED APPLICATION

This application claims priority to European Patent Application No. 20151826.3, filed Jan. 14, 2020, the contents of which are hereby incorporated herein by reference in their entirety.

BACKGROUND

Field of the Invention

The present disclosure relates to a bearing housing for a flow machine. The present disclosure further relates to a flow machine with a bearing housing.

Background Information

Conventional flow machines for conveying a fluid, for example centrifugal pumps, compressors, fans, expanders or turbines typically comprise a stationary machine housing that encloses a rotor, e.g. an impeller, which is arranged on a shaft rotating around an axis of the flow machine. These flow machine generally have at least one bearing unit with a radial and/or axial (thrust) bearing to support the shaft and the rotor. Typically, the bearing unit has a separate bearing housing that is firmly connected to the housing of the flow machine. In this case, the bearing housing comprises a bearing axis, a bearing chamber for receiving the bearing and a lubricant chamber for receiving a lubricant. The lubricant chamber and the bearing chamber are in fluid communication via an opening, so that the bearing can be cooled and lubricated by the lubricant during operation of the flow machine. Furthermore, the lubricant chamber has a wall portion for dissipating heat to the environment, wherein the wall portion has both an inner surface directed towards the lubricant chamber and an outer surface directed towards the environment.

In order to dissipate the frictional heat generated in the bearing during operation of the flow machine, cooling fins are not required but are typically included to increase the surface area of the housing and therefore the overall cooling capacity. These cooling fins are part of the housing and not a separate item. In another way, cooling can also be achieved by water or by increasing the size of the lubricant chamber and/or by increasing the amount of lubricant. The conventional methods cool the housing itself and the lubricant is only cooled indirectly through being in contact with the housing.

SUMMARY

It has been found that the conventional methods are very inefficient and limit the maximum heat dissipation across the bearings. Further, it has been shown in practice, that under certain operating conditions, for example high outside air temperatures, the cooling techniques mentioned are insufficient and expensive, resulting in an increased wear or even bearing failure or high bearing housing costs.

Accordingly, it is an object of the invention to improve a bearing housing in such a way that sufficient cooling of the bearing and the lubricant can be achieved even at high ambient temperatures and high product temperatures, and thus the ambient temperature range for the operation of the flow machine can be extended, the operating range can be increased (e.g. running speed) and in particular to enlarge the maximum heat dissipation across the bearing.

The objects of the invention meeting this problem are characterized by the features described herein.

Thus, an embodiment of the invention relates to a bearing housing for a flow machine, wherein the bearing housing comprises a bearing chamber for receiving a bearing and a lubricant chamber arranged at the bearing chamber for receiving a lubricant. The bearing chamber is in fluid communication with the lubricant chamber via an opening such that the lubricant can flow between the bearing chamber and the lubricant chamber. Furthermore, the bearing housing comprises a wall portion with a cooling fin for dissipating heat of the lubricant to the environment.

According to an embodiment of the invention, the cooling fin comprises a conduit for the lubricant through which conduit the lubricant chamber and the bearing chamber are in fluid communication such that the lubricant can be conducted from the lubricant chamber into the bearing chamber through the conduit to dissipate heat to the environment.

Therefore, the bearing housing according to an embodiment of the invention has a cooling fin, which cooling fin increases the total surface area of the bearing housing, which increases the heat exchange with the environment as the heat of the lubricant can be more effectively transferred to the environment through the lubricant flowing through the cooling fin, since the heat exchange between the lubricant and the wall portion for the dissipation of heat to the environment is increased.

This makes it possible to achieve sufficient cooling of the bearing and the lubricant even at high ambient temperatures and thus to expand the ambient temperature range for the operation of the flow machine. This ensures sufficient lubrication and cooling even at outside (e.g., environmental) air temperatures above 50° C., which can increase the service life of the bearing.

Therefore, in the operating state, the lubricant flows through the conduit in the cooling fin and is thereby directly cooled by the cooling fin and not only indirectly through being in contact with the bearing housing of the lubricant chamber. This is very efficient and enlarges the maximum heat dissipation across the bearing housing.

In order to increase the heat dissipation, the conduit is preferably arranged meandering in the cooling fin such that a majority of a volume of the cooling fin is filled through the conduit. The more windings the conduit comprises and the more volume the conduit takes up in the cooling fin, the more effectively the heat can be released into the environment. In particular the majority of the volume of the cooling fin is 50 to 90%, especially 60 to 80% of the volume of the cooling fin.

In a preferred embodiment, the cooling fin is arranged on an outer surface of the wall portion (external cooling fin), which outer surface is directed towards the environment.

Alternatively, the lubricant chamber is filled with the lubricant up to a lubricant level in the operating state and the cooling fin is designed as an internal cooling fin extending inside the lubricant chamber preferably completely below the lubricant level.

In practice the bearing housing can comprise external and internal cooling fins. This increases the overall surface area available for heat exchange between the bearing housing and the environment.

Furthermore, the cooling fin can comprise a cooling conduit through which cooling conduit a cooling fluid is flowable to additionally cool the lubricant which is flowable through the conduit.

The lubricant can be guided from the lubricant chamber through the conduit in the cooling fins to the bearing housing (and through the opening back to the lubricant chamber or directly to the bearing) via a forced oil circulation. It has proven to be advantageous if the opening is formed as a slot. This results in an improved supply of lubricant from the bearing chamber into the lubricant chamber and an enlarged lubricant circulation. Preferably, the slot extends in the direction of the bearing axis.

According to a preferred embodiment the bearing housing can comprise a bearing axis, wherein the cooling fin extends in the direction of the bearing axis and/or wherein the cooling fin extends in a circumferential direction with respect to the bearing axis. Thereby, the cooling fin can extend from the outer surface in a vertical direction to the bearing axis. This simplifies the production of the bearing housing. In addition, it is also possible, that the cooling fin extends spirally with respect to the bearing axis.

In practice the cooling fin can be designed in such a way that it has a substantially rectangular cross-sectional area in a section perpendicular to the bearing axis. Furthermore, the bearing housing can comprise a plurality of cooling fins. In addition, the cooling fins can be designed as a fin stack, which comprises a plurality of cooling fins. Of course, the bearing housing can also comprise a plurality of fin stacks.

In a very advantageous embodiment, the cooling fin is detachably arranged on the bearing housing, in particular is detachably screwed to the bearing housing. The cooling fin is therefore removable and can be constructed via additive manufacturing or traditional methods. The removable cooling fins allows changing of the cooling fins to suit bearing heat load and environmental conditions. For example, the plurality of cooling fins can be increased (attached) by a settable number of cooling fins if there is a high bearing heat load and the plurality of cooling fins can be decreased (removed) by a settable number of cooling fins if there is a lower bearing heat load. This increases the flexibility of the system. In an embodiment according to the invention, the cooling fins can be arranged parallel to each other.

In practice the conduit can be designed in different ways. For example, the conduit can comprise a cooling chamber, which cooling chamber corresponds to a reservoir in the conduit that can increase cooling efficiency. Furthermore, the conduit can include a plurality of windings. The conduit can be arranged inside the cooling fins and/or on a surface of the cooling fins. If the conduit is arranged on the surface of the cooling fins, the conduit is preferably arranged meandering on the surface such that a majority of the surface is covered by the conduit. In particular the majority of the surface is 50 to 90%, especially 60 to 80% of the surface of the cooling fin.

The disclosure also relates to a flow machine with the bearing housing according to embodiments of the invention. Here, the flow machine can be a pump, in particular a centrifugal pump. Preferably, the flow machine comprises the bearing arranged in the bearing chamber and a shaft rotatably mounted in the bearing. In a preferred embodiment, a conveying wheel is arranged in the lubricant chamber and is connected to the shaft in a rotationally fixed manner for guiding the lubricant through the conduit.

In practice the flow machine can comprise a spiral housing arranged in the bearing housing, which spiral housing is arranged around the conveying wheel for discharging a flow of the lubricant to the cooling fin which flow is generatable by the conveying wheel.

BRIEF DESCRIPTION OF THE DRAWINGS

The invention will be explained in more detail hereinafter with reference to the drawings.

DETAILED DESCRIPTION

In the following description, reference is made by way of example to an important application, namely that the flow machine is designed as a centrifugal pump.

Figure 1:
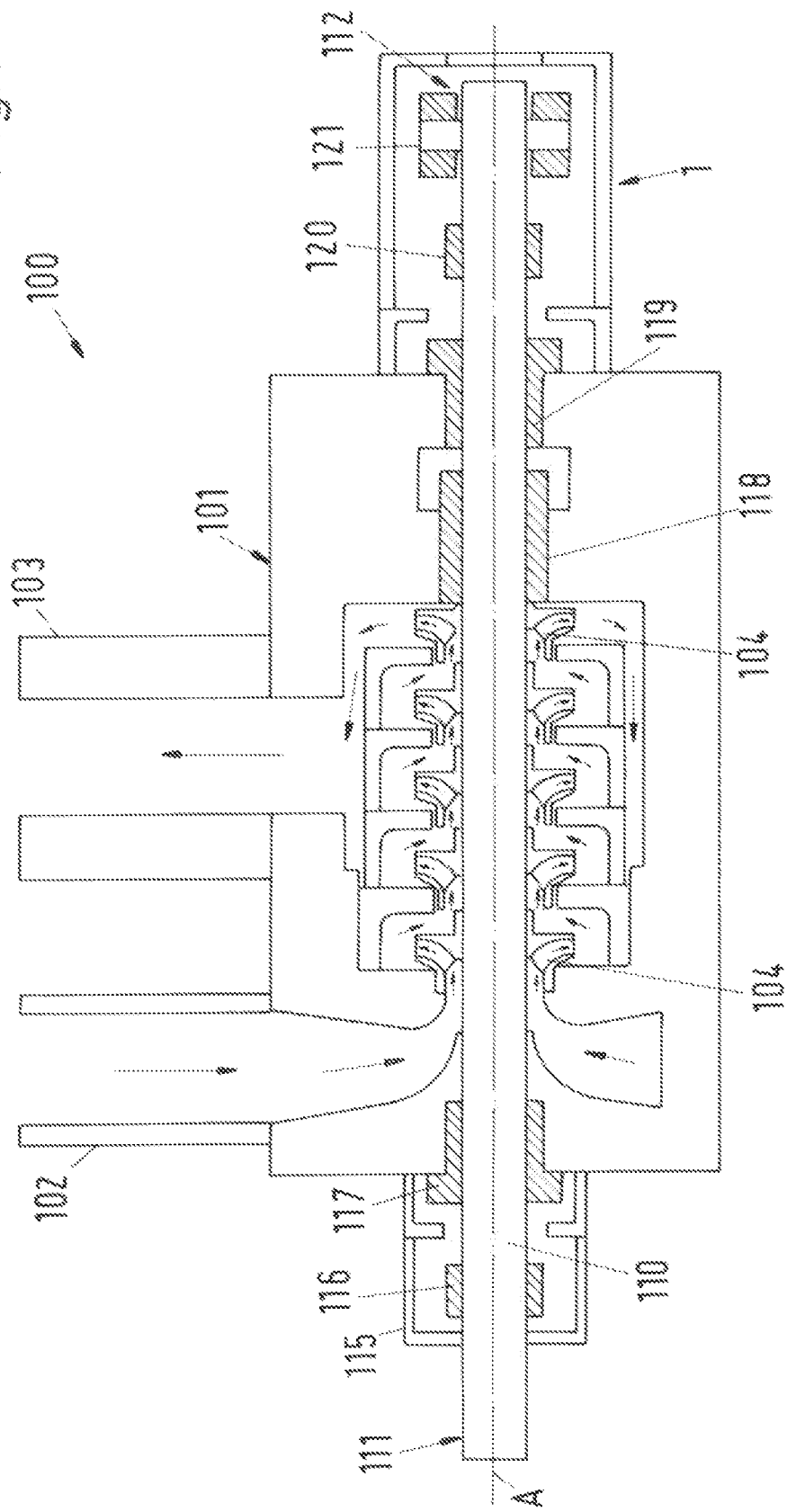
FIG. 1 is a sectional view of an embodiment of a flow machine according to the invention.

FIG. 1 shows a sectional view of an embodiment of a flow machine according to the invention, which is referred to in its unit with the reference sign 100. The embodiment of the flow machine 100 is a centrifugal pump 100 for conveying a fluid, for example water or crude oil or a multiphase liquid. It is clear, that the invention is neither limited to the centrifugal pump 100 shown in FIG. 1, nor to centrifugal pumps as such, but it refers to flow machines 100 in general. For example, the flow machine 100 can also be another type of pump, a compressor, a fan, an expander or a turbine.

The centrifugal pump 100 comprises a housing 101, which can include a plurality of housing parts, which are connected to each other to form the housing 101. The housing 101 of the centrifugal pump 100 comprises an inlet 102, through which the fluid to be conveyed enters the pump 100 and an outlet 103 for discharging the fluid. At least one impeller 104 is disposed inside the housing 101 to convey the fluid. The centrifugal pump illustrated in FIG. 1 is designed as a multi-stage pump with several impellers 104, here five impellers 104. All impellers 104 are arranged in a row on a shaft 110 in a torque-proof manner. During operation of the pump, the impellers 104 are rotated by the shaft 110 about an axial direction A, which is defined by the longitudinal axis of the shaft 110. The flow of the fluid is indicated in FIG. 1 by the arrows without a reference sign.

The shaft 110 is driven by a drive unit, not shown here, for example, an electric motor or any other motor, to which the shaft 110 is coupled. The end of the shaft 110 coupled to the drive unit is referred to as the drive end 111 of the shaft, while the other end of the shaft 110 is referred to as the non-drive end 112. According to the illustration in FIG. 1, the drive end 110 connected to the drive unit (not shown) is on the left side.

The pump 100 comprises the following components starting from the drive end 111 of the shaft 110 and to the direction of the non-drive end 112: a drive end bearing housing 115 receiving a radial (or bearing journal) bearing 116; a mechanical sealing 117 for sealing the pump 100 against leakage of the fluid along the shaft 110; the plurality of the impellers 104; a relief piston 118 for compensating the axial thrust generated by the impellers 104; another mechanical sealing 119 for sealing the non-drive side of the shaft 110 against leakage of the fluid to be conveyed; and a non-drive end bearing housing 1 receiving another radial (or journal-shaped) bearing 120, and a thrust (or axial) bearing 121 for supporting the non-drive end 112 of the shaft 110 with respect to the radial direction and the axial direction A.

Thus, the centrifugal pump 100 includes bearings 116, 120, 121 on both sides of the plurality of impellers 104, in this example at the drive end 111 of the shaft 110 and at the non-drive end 112 of the shaft 110.

The bearing housing 115 arranged at the drive end 111 of the shaft 110 is designed according to the invention. Of course, the bearing housing according to the invention can also be provided at the non-drive end 112 or also at both ends of the centrifugal pump 100, i.e. at the drive end 111 and at the non-drive end 112.

The centrifugal pump 100 according to FIG. 1 has a thrust (or axial) bearing 121 as mentioned above. The bearing housing according to the invention is also particularly suitable for pumps without a thrust (or axial) bearing. These pumps have a two-part relief device instead of the relief piston 118 (FIG. 1) for axial thrust compensation comprising a co-rotating relief disc and a fixed relief counter-disc, which form a gap extending in the radial direction, through which gap a part of the fluid being under pressure in the pump is discharged to the outside. In doing so, the shaft of the pump is kept in a state of equilibrium in the axial direction between the force generated by the axial thrust and the counterforce generated by the relief device. In contrast to the relief piston 118, the relief device is "self-regulating" and compensates the entire axial thrust, so that no separate axial bearing is required at the pump.

The bearing housing 115 will now be explained in more detail with reference to an embodiment of the bearing housing 115 for receiving the drive end 111 of the shaft 110.

Figure 2:
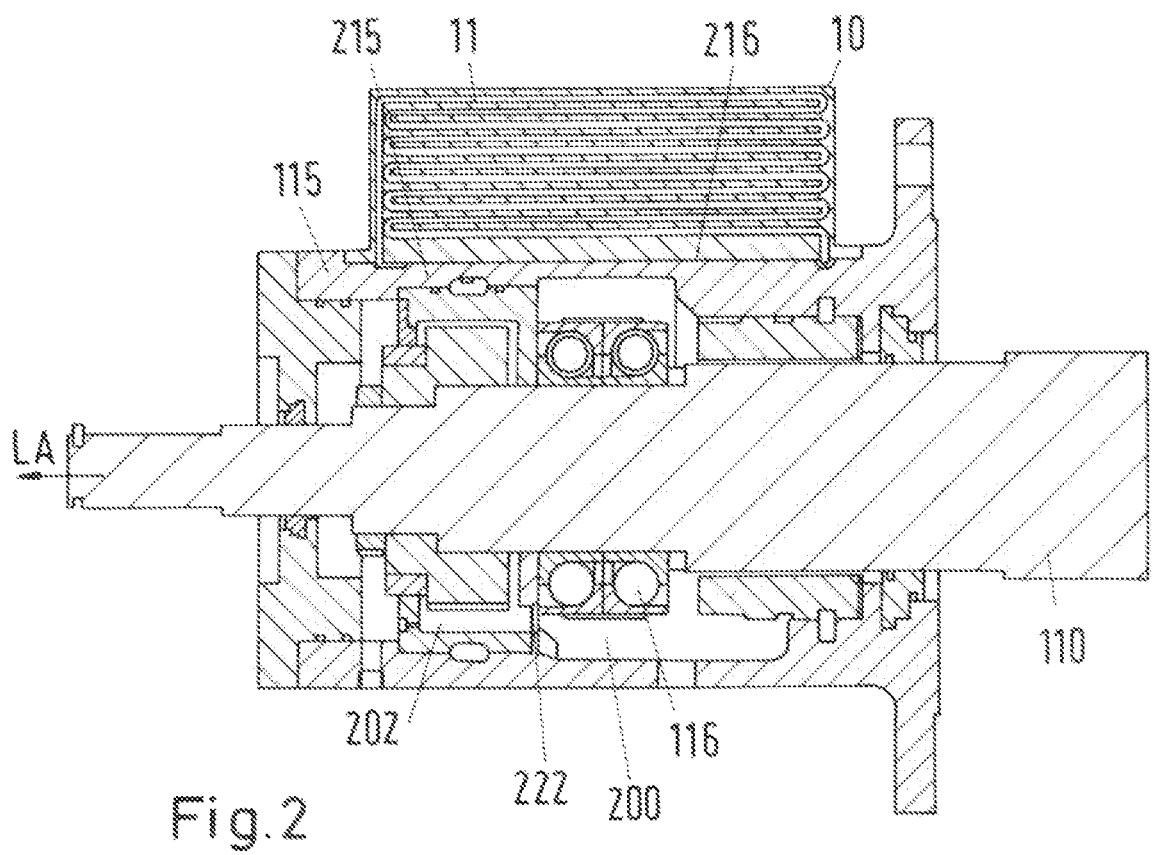
FIG. 2 is a sectional view of a bearing housing according to the invention.

FIG. 2 shows a sectional view of a first embodiment of the bearing housing 115 according to the invention for receiving the drive end 111 of the shaft 110 of the flow machine 100. The bearing housing 115 comprises a bearing axis LA and a bearing chamber 200 for receiving a bearing 116 and a lubricant chamber 202 arranged at the bearing chamber 200 for receiving a lubricant. The bearing chamber 200 is in fluid communication with the lubricant chamber 202 via an opening 222 such that the lubricant can flow between the bearing chamber 200 and the lubricant chamber 202. Furthermore, the bearing housing 115 comprises a wall portion 215 with a cooling fin 10 for dissipating a heat of the lubricant to an environment. For effectively dissipating the heat of the lubricant to the environment the cooling fin 10 comprises a conduit 11 through which the lubricant can be conducted from the lubricant chamber 202 into the bearing chamber 200. The lubricant chamber 202 and the bearing chamber 200 are in fluid communication through the conduit 11.

The cooling fin 10 is arranged on an outer surface 216 of the wall portion 215, which outer surface 216 is directed towards the environment. In order to achieve better cooling, the outer surface 216 can be pressurized with a fluid such as water or air, for example via a fan.

The cooling fin 10 extends in the direction of the bearing axis LA and from the outer surface 216 in a perpendicular direction to the bearing axis LA. Alternatively, the cooling fin could extend in a circumferential direction with respect to the bearing axis LA.

The cooling fin 10 is detachably arranged on the bearing housing 115. The cooling fin 10 can in particular be screwed to the bearing housing 115.

In order to increase the heat dissipation, the conduit 11 is arranged meandering in the cooling fin such that a majority of a volume of the cooling fin 10 is filled through the conduit 11. The more windings the conduit 11 comprises and the more volume the conduit 11 takes up in the cooling fin 10, the more effectively the heat can be released into the environment. Therefore, 50 to 90%, in particular 60 to 80% of the volume of the cooling fin 10 are filled with the conduit 11.

Figure 3:
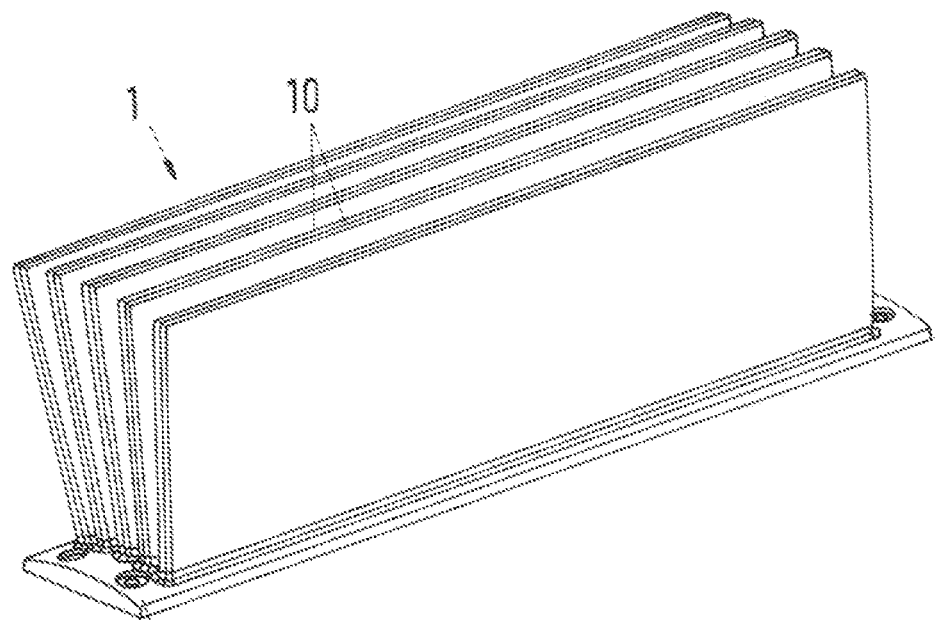
FIG. 3 is a perspective view of an embodiment of fin stack according, to the invention.

FIG. 3 shows a perspective view of an embodiment of a fin stack 1 according to an embodiment of the invention.

The fin stack 1 comprises a plurality of cooling fins which are arranged on a plate 12, which plate 12 can be attached to the outer surface 216 of the bearing housing 115. Therefore, the fin stack can be detachably arranged on the bearing housing 115.

Figure 4:
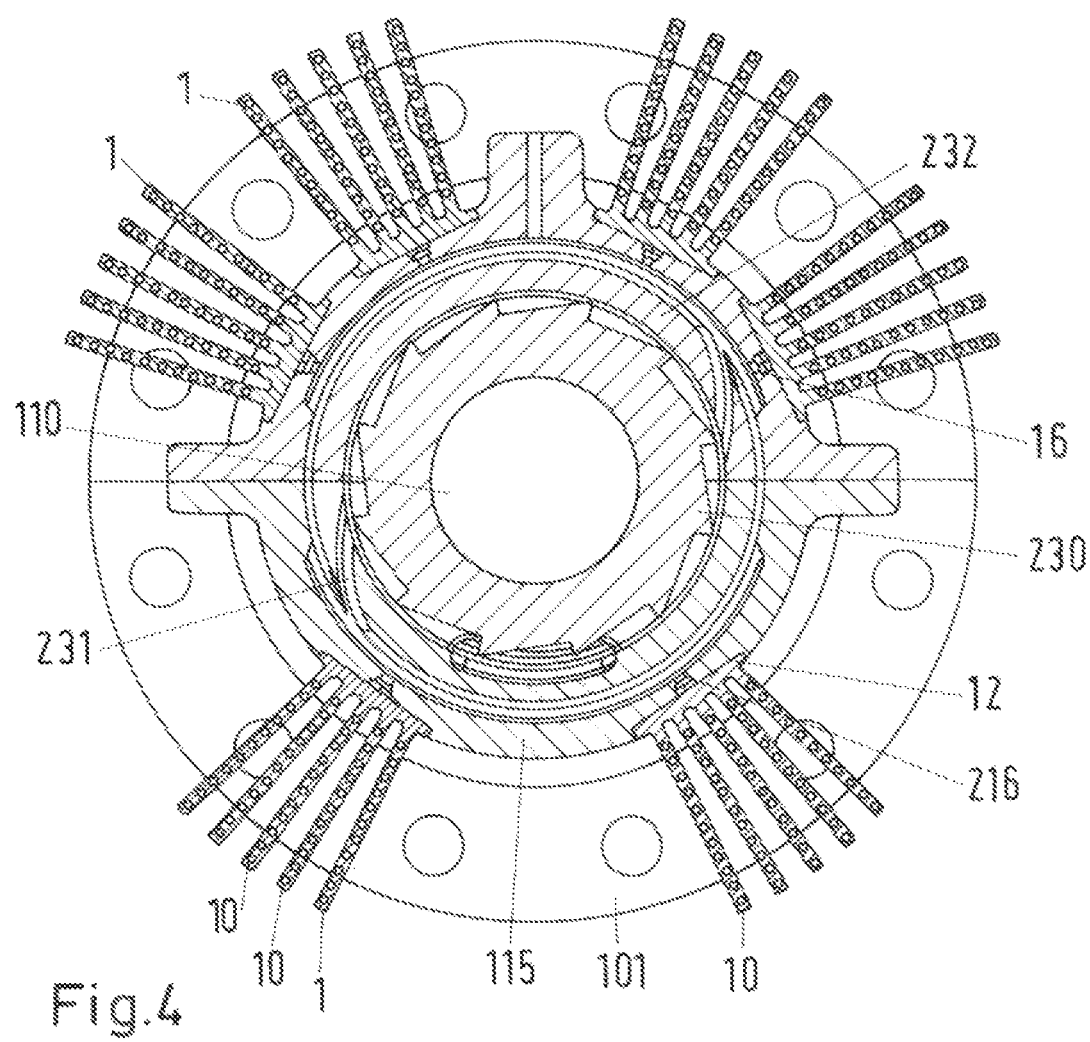
FIG. 4 is a sectional view of a second embodiment of a bearing housing according to the invention.

FIG. 4 shows a sectional view of a second embodiment of the bearing housing 115 according an embodiment of to the invention.

The bearing housing 115 comprises a plurality of fin stacks 1 with a plurality of cooling fins 10. The fin stacks are detachably arranged on the bearing housing 115. The fin stacks 10 are therefore removable and can be constructed via additive manufacturing. The removable fin stacks 1 enable changing of the cooling fins to suit a bearing heat load and environmental conditions. For example, the plurality of cooling fins can be increased (attached) by attaching fin stacks with a higher number of cooling fins, thereby providing a bigger surface for heat exchange. This increases the flexibility of the system.

A conveying wheel 230 is arranged in the lubricant chamber 202 and is connected to the shaft 110 in a rotationally fixed manner. If the shaft 10 is rotating in the operating state of the pump the conveying wheel 230 is rotating as well. A spiral housing 232 arranged around the conveying wheel 230 for discharging a flow of the lubricant to the cooling fin 10 which flow is generatable by the conveying wheel 230.

Spiral housing 232 (also known as volute casing) is designed to guide the flow out of the conveying wheel 230 in order to convert the lubricants flow's kinetic energy into static pressure; it serves to collect the fluid discharged from the conveying wheel 230 and route it to a discharge nozzle 231 into the entry 16 of the conduits 10. The conveying wheel 230 and the spiral housing 232 thereby create forced lubricant circulation, such that the lubricant can be guide from the lubricant chamber through the conduit 11 in the cooling fins 10 to the bearing housing (and through the opening back to the lubricant chamber).

Figure 5:
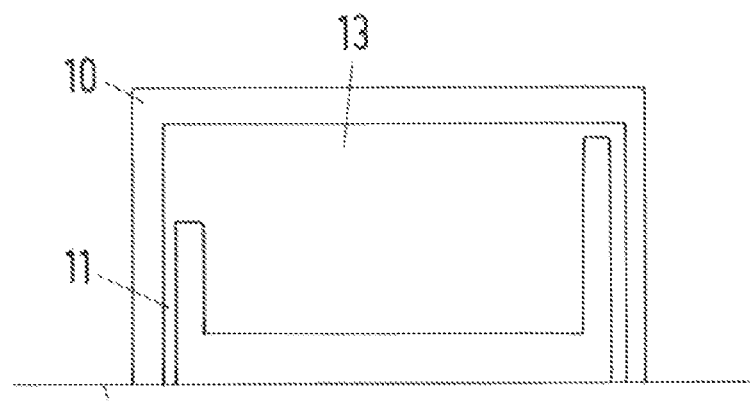
FIG. 5 is a sectional view of a fin stack with a cooling chamber.

FIG. 5 shows a sectional view of an embodiment of the cooling fins 10. The conduit 11 of the cooling fin 10 is arranged in the inside of the cooling fin. The conduit 11 thereby comprises a cooling chamber 13, which cooling chamber 13 is a reservoir in the conduit 11 that increases the cooling efficiency. The cooling chamber 13 can have any suitable shape and can be designed in different ways depending on the application.

What is claimed:

1. A bearing housing for a flow machine, the bearing housing comprising:
a bearing chamber configured to receive a bearing; and
a lubricant chamber arranged at the bearing chamber and configured to receive a lubricant, the bearing chamber being in fluid communication with the lubricant chamber via an opening such that the lubricant is capable of flowing between the bearing chamber and the lubricant chamber, the bearing housing comprising a wall portion with a cooling fin configured to dissipate heat of the lubricant to an environment, the cooling fin comprising a conduit for the lubricant through which conduit the lubricant chamber and the bearing chamber are in fluid communication such that the lubricant is capable of being conducted from the lubricant chamber into the bearing chamber through the conduit to dissipate the heat to the environment, the conduit being arranged in the cooling fin.

2. The bearing housing according to claim 1, wherein the cooling fin is arranged on an outer surface of the wall portion, the outer surface directed towards the environment.

3. The bearing housing according to claim 2 further comprising a bearing axis, the cooling fin extending in a direction of the bearing axis or the cooling fin extending in a circumferential direction with respect to the bearing axis.

4. The bearing housing according to claim 3, wherein the cooling fin extends from the outer surface in a vertical direction to the bearing axis.

5. The bearing housing according to claim 3, wherein the cooling fin has a substantially rectangular cross-sectional area in a section perpendicular to the bearing axis.

6. The bearing housing according to claim 1, wherein the conduit is arranged meandering in the cooling fin such that a majority of a volume of the cooling fin is filled through the conduit.

7. The bearing housing according to claim 1, wherein the cooling fin is detachably arranged on the bearing housing.

8. The bearing housing according to claim 1, wherein the conduit comprises a cooling chamber.

9. The bearing housing according to claim 1, wherein the cooling fin is one of a plurality of cooling fins.

10. The bearing housing according to claim 9, wherein the plurality of cooling fins are arranged parallel to each other.

11. The bearing housing according to claim 1, wherein the cooling fin is screwed to the bearing housing.

12. A flow machine, comprising:
a bearing housing according to claim 1.

13. The flow machine according to claim 12, wherein the flow machine is a pump.

14. The flow machine according to claim 12, wherein the bearing is arranged in the bearing chamber and a shaft is rotatably mounted in the bearing.

15. The flow machine according to claim 14, further comprising a conveying wheel arranged in the lubricant chamber and connected to the shaft in a rotationally fixed manner to guide the lubricant through the conduit.

16. The flow machine according to claim 15, further comprising a spiral housing arranged in the bearing housing, the spiral housing arranged around the conveying wheel to discharge a flow of the lubricant to the cooling fin, the flow being generatable by the conveying wheel.

17. The flow machine according to claim 12, wherein the flow machine is a centrifugal pump.

* * * * *